(12) United States Patent
Sparrow et al.

(10) Patent No.: US 6,492,937 B1
(45) Date of Patent: Dec. 10, 2002

(54) HIGH PRECISION RANGE MEASUREMENT TECHNIQUE

(75) Inventors: Mitchell J. Sparrow, Wayne, NJ (US); Joseph Cikalo, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/985,297

(22) Filed: Nov. 2, 2001

(51) Int. Cl.$^7$ .............................................. G01S 13/08
(52) U.S. Cl. .......................... 342/125; 342/13; 342/14; 342/16; 342/52; 342/58; 342/118; 342/127; 342/357.01; 342/357.06; 342/357.08; 701/300
(58) Field of Search .............................. 342/52, 58, 60, 342/118–146, 175, 195, 357.01–357.17, 42–51, 165, 173, 174, 13–20, 25; 701/300, 301, 302

(56) References Cited

U.S. PATENT DOCUMENTS

| | | |
|---|---|---|
| 4,890,056 A | 12/1989 | Peters et al. |
| 4,924,232 A | 5/1990 | Hudson et al. |
| 4,952,940 A | 8/1990 | Kuepfer |
| 5,003,314 A | 3/1991 | Berkowitz et al. |
| 5,040,156 A | 8/1991 | Föller |
| 5,245,347 A | 9/1993 | Bonta et al. |
| 5,495,248 A * | 2/1996 | Kawase et al. ................ 342/25 |
| 5,526,001 A | 6/1996 | Rose et al. |
| 5,559,517 A | 9/1996 | Didomizio |
| 5,559,518 A | 9/1996 | Didomizio |
| 5,801,659 A * | 9/1998 | Helfrick ................. 342/357.08 |
| 5,889,490 A | 3/1999 | Wachter et al. |
| 6,366,233 B1 * | 4/2002 | Oshida ......................... 342/47 |

* cited by examiner

Primary Examiner—Bernarr E. Gregory
(74) Attorney, Agent, or Firm—Hunton & Williams

(57) ABSTRACT

Electronic Warfare (EW) systems aboard aircrafts are used to protect them from guided missile by denying threat radar systems the ability to track the aircrafts. In a typical operation, a threat radar system transmits RF signals aimed at the target aircraft. The surface of the target reflects a portion of the incident signal back towards the threat radar antenna where the reflected signal is detected, allowing the threat radar system to determine the target's range, angle and velocity. The present invention relates to EW systems that are dependent on measuring the RF phase of a signal transmitted by a target tracking threat radar. The use of the invented technique will make it possible to implement a robust Electronic Counter-Measures (ECM) technique, known as Cross-Eye, using two airborne platforms. The technique is very effective in preventing a threat radar from tracking a target aircraft and guiding a launched missile to the target aircraft.

18 Claims, 8 Drawing Sheets

HIGH PRECISION RANGE MEASUREMENT TECHNIQUE

FIELD OF THE INVENTION

The present invention relates generally to radar systems and in particular to high precision range measurement techniques used in radar systems.

BACKGROUND OF THE INVENTION

Electronic Warfare (EW) generally relates to military action involving the use of electromagnetic and directed energy to control the electromagnetic spectrum or to attack the enemy. The three major subdivisions within EW are Electronic Attack, Electronic Protection and Electronic Warfare Support. Electronic Attack (EA) is the division of EW involving the use of electromagnetic or directed energy to attack personnel, facilities or equipment with the intent of degrading, neutralizing or destroying enemy combat capability.

EW Systems aboard aircraft have long been used to protect the aircraft by denying a threat radar system the ability to track the target aircraft and guide launched missiles to intercept it. In a typical operation, a threat radar system tracking a target aircraft transmits RF signals, such as a sequence of pulses, aimed at the target. The surface of the target reflects a portion of the incident electromagnetic energy back toward the threat radar antenna where the pulse echo is detected, allowing the radar system to determine the target's range, angle and velocity. Based on this information, the threat radar system can launch and guide a missile to intercept the target.

To effectively counter such radar systems, electronic warfare (EW) systems located on target aircraft attempt to interfere with threat radar signals by generating electronic counter measure (ECM) signals designed to confuse, mislead or overwhelm the tracking functions of the threat radar receiver. One technique used in the EW systems to interfere with the operation of threat radar system is to generate an ECM signal that is out of phase and inverted in amplitude as compared to the signal reflected by the target and received by the threat radar system. This technique is known as a Cross-Eye. Such an inverted signal is than targeted to the receiver of the threat radar to basically nullify the signal reflected by the target and received by the threat radar. To accomplish such electronic counter-measure, the EW system on the target aircraft first accurately determines the phase of a radar signal arriving at two spatially separated distant antennas located on the aircraft. Based on the phase difference of such received RF signal, an EW system can generate and transmit an ECM signal via the same two antennas towards the threat radar system. Such signals can be made to arrive on the threat radar antenna aperture 180 degrees out of phase and with inverted amplitudes.

In conventional EW systems, the two antennas receiving the RF signal from the threat radar are located on a single aircraft. When these antennas on a single platform are used to generate and transmit the interfering signal that is 180° out of phase and inverse in amplitude compared to the reflected signal, such amplitude and phase inversion has to be very precise for such ECM system to work effectively. The errors tolerable in phase and amplitude inversion are directly proportional to the separation distance between the two platforms. In the conventional approach, where these antennas are on a single platform and the available separation distance is very short, the tolerable error is so small that the signal parameter values must be matched to within a few tenths of one degree in phase and within a few hundreds of one dB in amplitude. Such low error levels can not be practically achieved, thus making conventional ECM systems of this type ineffective, or at least sub-optimal.

Since both tolerable error values are directly proportional to the length of an imaginary line connecting the antennas, the higher the separation distance between the two antennas, higher the amount of tolerable errors. One solution to increase the tolerable error values is to increase the distance between the antennas. In a situation where two separate airborne platforms such as aircraft or Unmanned Airborne Vehicle (UAV) are available as mounts for the EW antennas, almost any length of baseline can be made available. The increased length allows for higher error tolerance that need be achieved in the matching of the phase and amplitudes of the signals generated by the EW antenna system. It is practically feasible to achieve phase and amplitude inversion with such higher error tolerance, which makes such systems practically useful.

However, to exploit the potential of a longer baseline between antennas requires a solution to the following problem. When an EW system mounts the antennas that generate the ECM signals on two different aircrafts, the local oscillator (LO) signals driving both of these antennas need to be either of same phase or of a known phase difference value so that any resultant errors may be compensated. If not compensated, the resultant phase errors between the signals of the two local oscillators appear as time delays in the radar signal. To take advantage of higher error tolerances available with the use of a longer baseline, a solution to this problem of phase errors between signals from two local oscillators mounted on different UAV platforms must be found.

Other problems and drawbacks also exist.

SUMMARY OF THE INVENTION

An embodiment of the present invention discloses a system for precise measurement of range between two platforms, using the global positioning system (GPS) located on both of these platforms, a range-only radar (ROR) located on one platform and a repeater located on the other platform.

According to one aspect of the invention, an electronic counter-measures system is provided with antennas located on two platforms.

According to another aspect of the invention, local oscillators are provided on both platforms.

According to another aspect of the invention, the precise measurement of range is used to calculate phase compensation sequence for one of the local oscillator.

According to another aspect of the invention, a local oscillator on one platform is phase compensated based on the information received from the other platform.

According to one embodiment of the present invention, the platforms are located on airborne vehicles.

Accordingly, it is one object of the present invention to overcome one or more of the aforementioned and other limitations of existing systems for very high precision range measurement.

It is another object of the present invention to provide an electronic counter-measures system using antennas located on two platforms that uses a very high precision range measurement system.

It is yet another object of the present invention to provide an electronic counter-measures system that overcomes the problems enumerated above associated with antennas located on a single aircraft.

It is another object of the present invention to provide an electronic counter-measures system to overcome the problems associated with low tolerable errors when using antennas located on a single aircraft.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the systems and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

To facilitate understanding, identical reference numerals have been used to denote identical elements common to the figures.

DETAILED DESCRIPTION OF THE INVENTION

Figure 1:
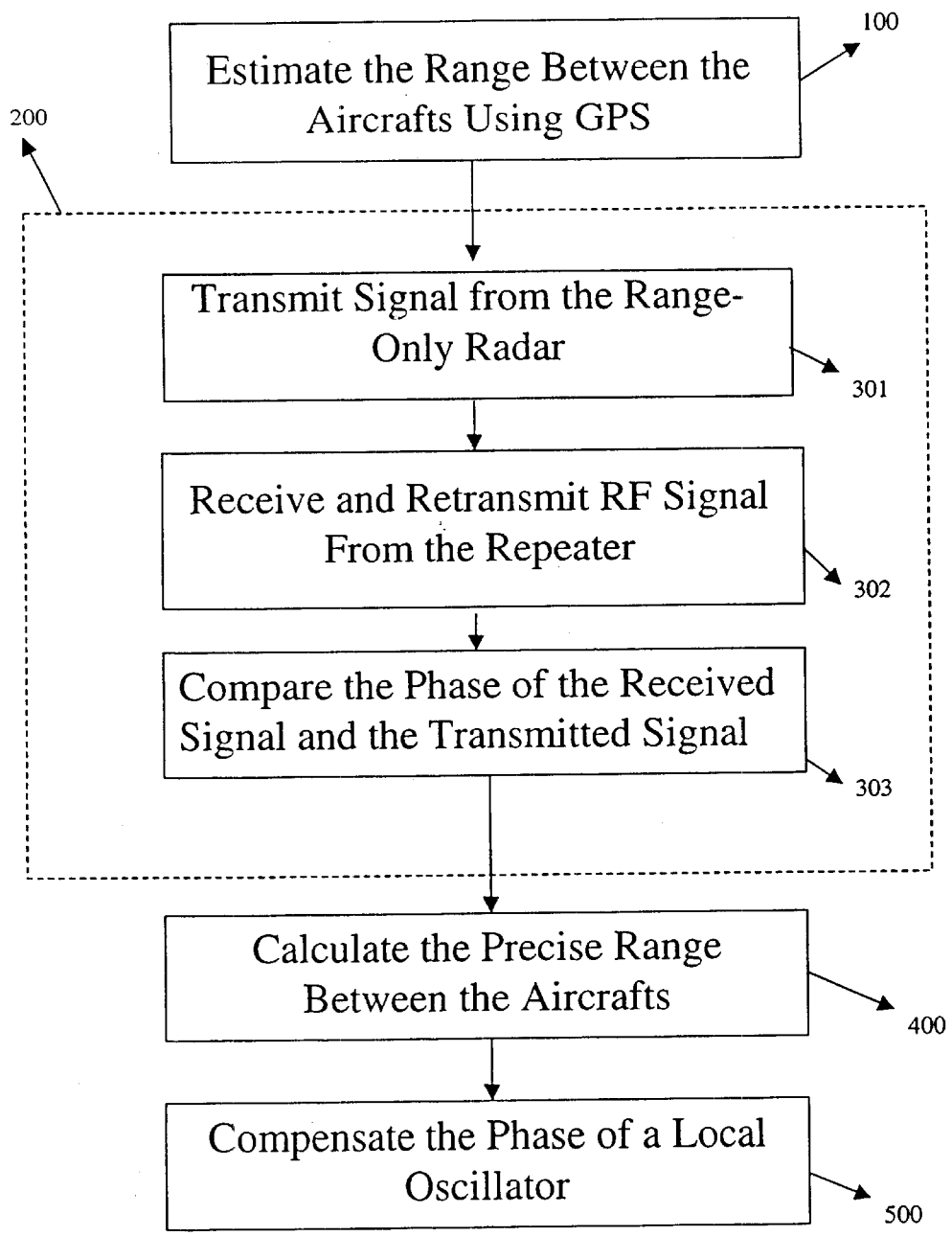
FIG. 1 is a block diagram of a method of high precision range measurement system used by airborne radar platform according to an embodiment of the invention.

FIG. 1 is a block diagram of the steps performed in one embodiment of the high precision range measurement system (GPS) used for precise measurement of range between two platforms. In the first step 100, the method uses global positioning system receivers located on each of the platforms to get the geo-location data sets used to calculate an estimate of range. Next, in step 301, a range-only radar module located on one of the platforms transmits a stream of pulses to a repeater module located on the other platform. In step 302, the repeater module receives and retransmits the pulses it received from the range-only radar. In step 303, the range-only radar receives the re-transmitted pulses from the repeater and compares the phase of the received signal to the phase of the transmitted signal to calculate phase displacement between the two. In step 400, the measured phase displacement is converted to a measure of distance, that is used to define the precise range between the radars installed on two platforms. In step 500, the value of the precise range between the platforms is used to compensate the phase of a local oscillator.

Figure 2:
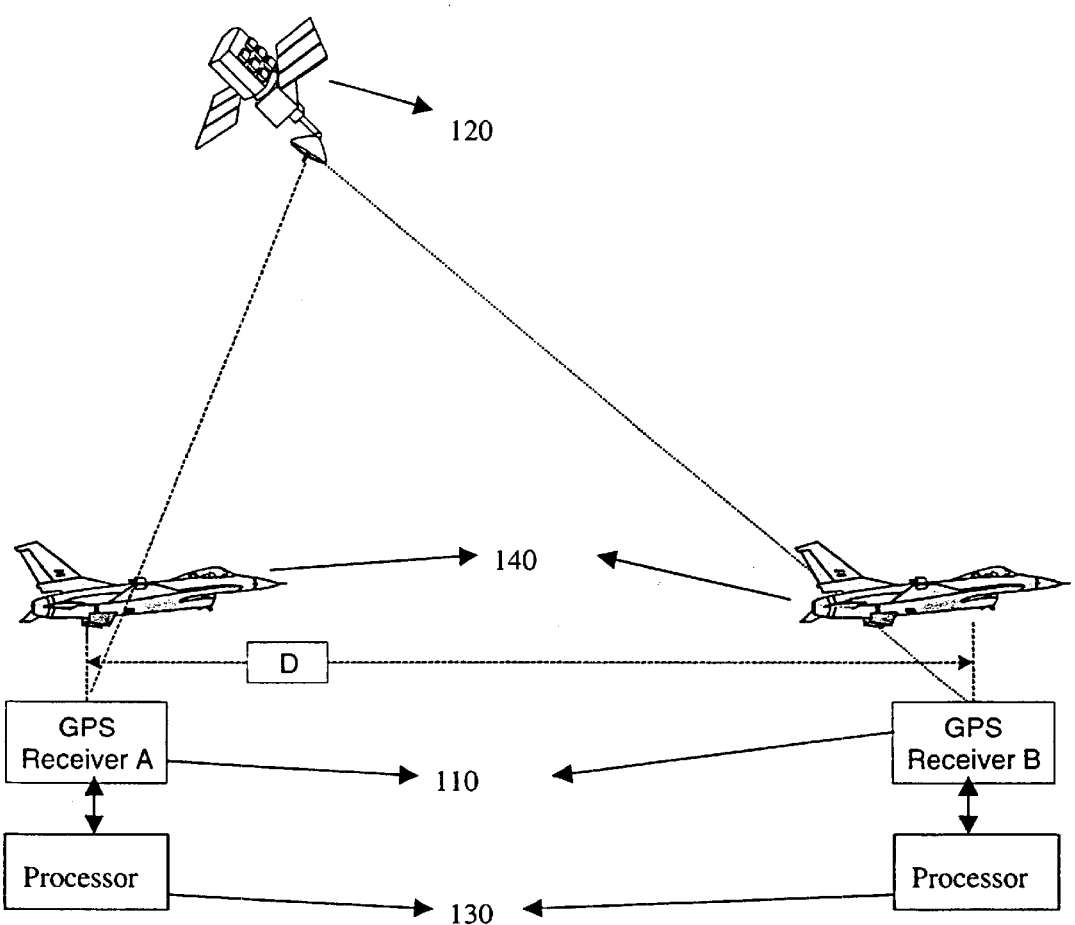
FIG. 2 is a block diagram of a method of high precision range measurement system using the global positioning system (GPS) to make preliminary estimates of distance between two aircrafts according to an embodiment of the invention.

FIG. 2 is a block diagram of an embodiment of the invention using the global positioning system to make a preliminary estimate of distance between two platforms. According to this embodiment, the two platforms are airborne platforms, such as two aircrafts 140. It comprises GPS receivers 110 located on each airborne platform, a GPS satellite 120, and the processors 130 on each of the airborne platforms. The use of a GPS system using GPS receivers and the GPS satellite for measuring distance between two locations is well known in the art. Typically, GPS receivers 110 receive radio signals transmitted by the GPS satellite 120 encoded with a message of the time the signals were emitted. The distance from each satellite is computed by dividing the time taken for transmission by the speed of transmitted signal. The processors 130 use triangulation methods, which are well known to those of ordinary skill in the art, using the distance of each receiver from the satellite to calculate the geo-location of that airborne platform.

In one embodiment of the invention, GPS receivers 120 using Kalman filters are used to obtain the geo-location of each airborne platform. However, other commercially available GPS systems can be used instead. The processors 130 use a tracking algorithm to produce a measure of range between the airborne platforms. Generally, the accuracy of the range measurement achieved by using such a GPS system is in the range of +/−20 centimeters (cm).

However, to effectively use radars on two separate platforms in an ECM operation, a much more accurate measurement of distance between the two airborne platforms needs to be made. Generally the tolerable error is of the order of less than one millimeter. Such accuracy is hard to achieve using GPS receivers alone. To overcome this difficulty, the range data obtained by the GPS system described above is supplemented by the systems described in FIG. 3 to FIG. 7.

Figure 3:
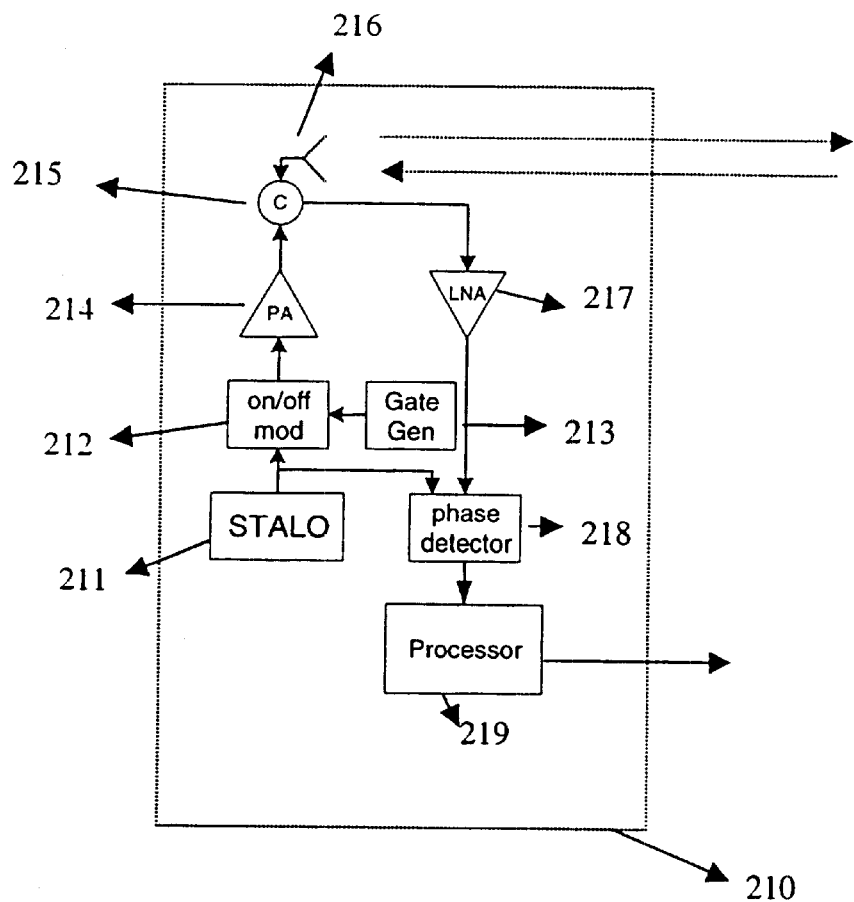
FIG. 3 is a block diagram of an exemplary range-only radar module used in the high precision range measurement system according to an embodiment of the invention.

FIG. 3 is a block diagram of the range-only radar module 210 located on one of the platforms and used to transmit and receive the signal which is used to measure the distance between the two airborne platforms with a higher level of accuracy. The range-only radar module 210 comprises a stable local oscillator (STALO) 211, an on/off modulator 212, a gate generator 213, a power amplifier 214, a circulator 215, an antenna element 216, a low noise amplifier 217, a phase detector 218, and a processor 219.

The stable local oscillator 211 is used to generate an RF carrier frequency signal. The signal generated by the STALO 211 is fed into the on/off modulator 212. The gate generator 213 generates a gating signal that is also fed into the on/off modulator. The modulation of the RF carrier frequency by the on/off modulator 212 is controlled by the gate generator 213. The modulated output signal from the on/off modulator 212 is fed into the power amplifier 214. The power amplifier 214 amplifies the gated signal output from the on/off modulator 212. The resulting amplified signal output from the power amplifier 214 is input into the circulator 215. The circulator 215 alternately directs the signal from the power amplifier 214 to the antenna element 216 and the signal from the antenna element 216 to the low noise amplifier 217. When the circulator 215 directs the output signal from the power amplifier 214 to the antenna element 216, the antenna element 216 works as a radiator of that signal.

The antenna 216 is also used to receive the signal retransmitted by the repeater module (see step 302, FIG. 1) located on the other airborne platform. The circulator 215 forwards the signal received by the antenna element 216 to the low noise amplifier 217. The low noise amplifier 217 amplifies the signal received by the antenna element 216. The amplified signal output from the low noise amplifier 217 is fed into the phase detector 218. The phase of the received signal is detected and compared to the phase of the transmitted signal by the phase detector 218, and the phase information is input to the processor 219. Processor 219 uses the phase information to calculate the precise range between the two airborne platforms using the procedure described further in FIG. 5 and FIG. 6 below.

The design of stable local oscillator 211 is well known to those of ordinary skill in the art. Any oscillator that is able to generate a stable RF base frequency may be employed as stable local oscillator 211. An embodiment of the present invention may employ a well known inductor-capacitor resonant tank circuit such as a Hartley oscillator or an overtone mode crystal oscillator circuit such as Colpitts oscillator as stable local oscillator 211. In an embodiment of the present invention, a Surface Acoustic Wave (SAW) or a Dielectric Resonator Oscillator (DRO) is used as stable local oscillator 211 to generate stable RF signal base.

The on/off modulator 212 is a circuit that modulates a signal base input from the STALO 211 using another gating input signal generated by the gate generator 213. Generally, the gating signal generated by the gate generator 213 is in the form of a saw-tooth waveform, the value of which alternates between a maximum and zero level. When the value of such gating signal is a maximum, the output signal of the on/off modulator 212 is the same as the input signal base to be modulated. When the value of the gating signal is zero, the output of the on/off modulator is zero. The design of on/off modulator 212 is well within the skill of the ordinary artisan. For example, a commercially available amplitude modulator capable of modulating an RF signal can be used as on/off modulator 212. A typical example of such a modulator is, e.g. an SEM 124 from Narda Microwaves, Inc., in which inputs can be configured to modulate an RF carrier signal. In one embodiment of the invention, a GaAs MMIC switch is used to implement the on/off modulator 212.

The gate generator 213 is a circuit that generates a gating signal that will be input to the on/off modulator 212 to modulate the base signal frequency. Implementation of the gate generator 213 is well known to those of ordinary skill in the art. Typically, a binary gate generator is used to generate a gating signal. A simple gate generator in its basic form may be implemented using a timer integrated circuit such as a CMOS 555, where the output of such a timer provides the gating pulse. In an embodiment of the present invention, Field Programmable Gate Array (FPGA) is used as a gate generator 213.

The output signal from the on/off modulator 212 is amplified by the power amplifier 214. Design and implementation of an RF power amplifier is well known to those of ordinary skill in the art. Popular off-the-shelf integrated circuit power amplifiers such as the RF2105L (High Power Linear UHF Amplifier by RF Microdevices, Inc.) that is designed to be used as final RF amplifiers in cellular transmitters or the CGY2021G2-W (MMIC power amplifier from Philips Semiconductors) that is designed using GaAs technology may be used to implement the power amplifier 214. In an embodiment of the present invention, either a GaAs, a GaN, an SiC or an AlGaN MMIC is used as power amplifier 214.

The amplified output signal from the power amplifier 214 is fed through the circulator 215 to the antenna element 216. A circulator, in its basic form, is a three port device formed by a symmetrical Y junction coupled to magnetically biased ferrite material. A circulator permits flow of RF energy in one direction only, e.g., from port 1 to 2, 2 to 3, and 3 to 1. For example, port 1 to 2 of the circulator is used to allow flow of the amplified RF output from the power amplifier 214 to the antenna element 216 and port 2 to 3 of the circulator is used to allow flow of the RF signal received by the antenna element 216 to the low noise amplifier 217. This or other equivalent implementation of the circulator is well known to those of ordinary skill in the art. The antenna element 216 is a specialized transducer that converts RF fields into AC signals or vice-versa. Implementation of an antenna element and its coupling to a circulator is well known to those of ordinary skill in the art. In an embodiment of the present invention, a Vivaldi Flare Notch Radiator type of antenna is used to transmit and receive RF signals.

The RF signal received by the antenna 216 and converted to an electrical signal is transmitted to the low noise amplifier 217 for amplification. A low noise amplifier that has very low internal noise is used to amplify the low power signal generated by the antenna element 216. Any of the various off-the-shelf low noise amplifier such as RF2365 (3V Low Noise Amplifier by RF Microdevices, Inc.) can be used to implement the low noise amplifier 217. In an embodiment of the present invention a GaAs MMIC is used as low noise amplifier 217. This or other alternate implementation of low noise amplifier 217 is well known to those of ordinary skill in the art.

As illustrated in FIG. 3, the output from the low noise amplifier 217 which represents the signal received by the antenna 216 and the output of the stable local oscillator 211, which generated the signal transmitted out from the antenna 216, are inputted into the phase detector 218. The phase detector 218 is a circuit that detects the difference in phase between corresponding points on these two input signals. An example of an off-the-shelf phase detector system is Model 73129 Double Balanced Mixer, from Anaren Microwave, Inc., which is a fully integrated RF integrated circuit for measuring amplitude and phase differences between two independent input signals. Other devices or arrangements are also possible. Implementation of a phase detector circuit is well known to those of ordinary skill in the art.

The output information from the phase detector 218 regarding the phase difference is inputted into the processor 219 located on the airborne platform. A number of popular off-the-shelf digital signal processors can be used to process the phase information. Implementation of the processor 219 is well known to those of ordinary skill in the art.

Figure 4:
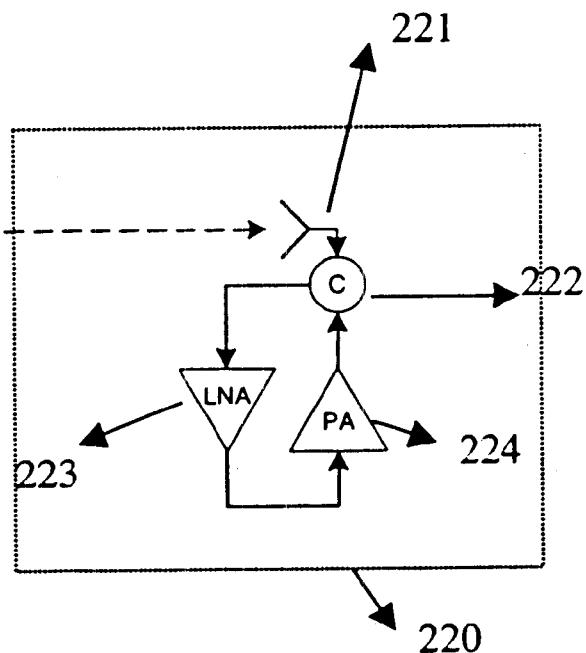
FIG. 4 is a block diagram of an exemplary repeater module used in the high precision range measurement system according to an embodiment of the invention.

FIG. 4 is a block diagram of the repeater 220 located on the airborne platform other than the one with the range-only radar 210. The repeater 220 is used to receive the signal generated by the range-only radar and to re-transmit it back to the range-only radar. The repeater 220 system comprises an antenna module 221, a circulator 222, a low noise amplifier 223, and a power amplifier 224. The antenna module 221 operates as a transciever of RF signals to and from the range-only radar 210 (see FIG. 3). The antenna module 221 receives the signal transmitted by the antenna module 216 (see FIG. 3) of the range-only radar 210. The received signal is passed through the circulator 222 to a low noise amplifier 223. The low noise amplifier 223 amplifies the signal and the amplified signal is input to the power amplifier 224. The power amplifier further amplifies the signal so that it can be input to the antenna module 221 to be re-transmitted out. The output from the power amplifier 224 is passed through the circulator 222 to the antenna module 221. The antenna module 221 transmits the signal back to the airborne platform with the range-only radar 210.

The antenna module 221 is comprised of a number of elements made up of specialized transducer material that convert RF fields into AC signals and vice-versa. Implementation of these antenna elements and coupling them to a circulator is well known to those of ordinary skill in the art. In an embodiment of the present invention a Vivaldi Flare Notch Radiator type of antenna is used to transmit and receive RF signal.

The signals received by the antenna module 221 and converted to electrical signals are passed through the circulator 222 to the low noise amplifier 223. (The functioning of the circulator 221 in the repeater module 220 is similar to functioning of the circulator 215 in the range-only radar module 210). For examples port 1 to 2 of the circulator 221 may be used to allow flow of the electrical signal from the antenna module 221 to the low noise amplifier 223 and port 3 to 1 may be used to allow flow of electrical signals from the power amplifier 224 to the antenna module 221. The implementation of the circulator 222 is well known to those of ordinary skill in the art.

The RF signals received by the antenna 221 and converted to an electrical signal is passed through the circulator 222 to the low noise amplifier 223 for amplification. Any of the devices discussed above for low noise amplifier 217 may be suitable for use as low noise amplifier 223. (The functioning of low noise amplifier 217 is as illustrated in FIG. 3). In an embodiment of the present invention a GaAs MMIC type of low noise amplifier is used as low noise amplifier 223. The implementation of low noise amplifier 223 is well known to those of ordinary skill in the art.

The amplified output signal from the low noise amplifier 223 is input into the power amplifier 224. Any of the devices discussed above for power amplifier 214 may be suitable for use as power amplifier 224. (The functioning of power amplifier 214 is as illustrated in FIG. 3). In an embodiment of the present invention a GaAs MMIC type of power amplifier is used as power amplifier 224. The implementation of power amplifier 224 is well known to those of ordinary skill in the art. The amplified signal output from the power amplifier 224 is passed through the circulator 222 and fed to the antenna module 221. The antenna module 221 transmits this signal in the direction of the range-only radar 210.

Figure 5:
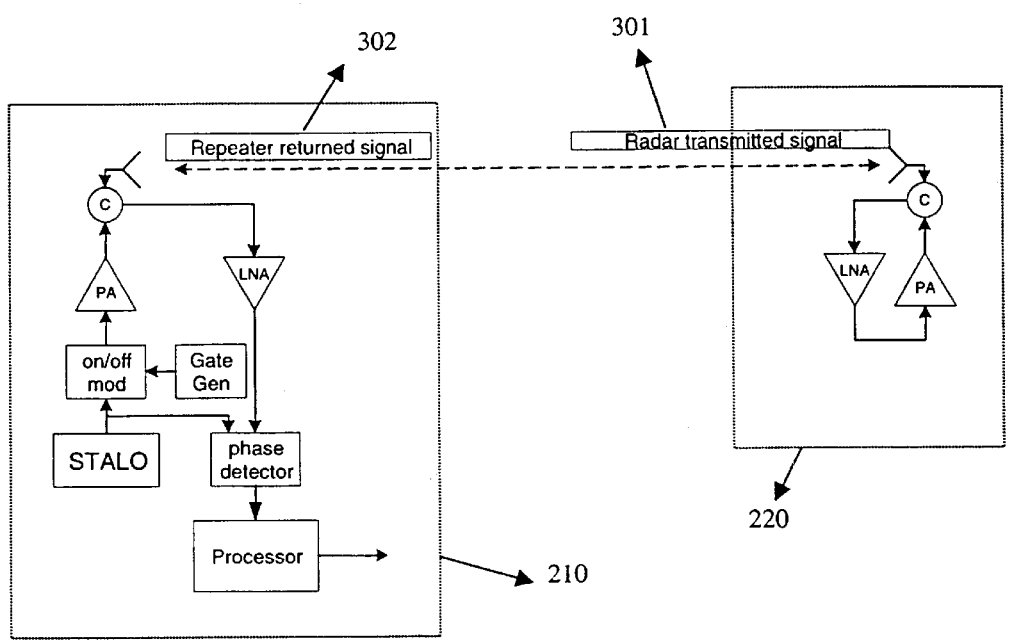
FIG. 5 is a block diagram of an exemplary range-only radar module used with an exemplary repeater module in the high precision range measurement system according to an embodiment of the invention.

FIG. 5 is a diagram of the range-only radar 210 functioning together with the repeater 220. The RF signal transmitted by the range-only radar 210 located on one platform is received by the repeater 220 located on another platform. In an embodiment of the invention, the range-only radar 210 and the repeater 220 are mounted on two separate airborne platforms. Alternate applications of the invention are possible using different type of separate platforms such as, two ships or two ground vehicles.

The range-only radar 210 and repeater 220 are used together as described in FIG. 5 to determine the unknown error distance that complements the initial measure of range established by the GPS system as described in FIG. 2. Once the initial measure of range is established using the GPS system as described in FIG. 2, an RF carrier frequency for the range-only radar 210 is selected. The wavelength of the RF signal should be greater than the error size of the measure of range established by the GPS system.

The range-only radar 210 transmits a stream of coherent signal pulses 301. The pulses travel to the other platform and are received by the repeater 220. The repeater 220 retransmits the signal pulses 302. In one embodiment of the invention the repeater 220 retransmits the pulses 302 with a known delay in the retransmission. The returned pulses 302 are received by the range-only radar 210. The range-only radar 210 compares the phase of the transmitted signal 301 and the received signal 302 and measures the phase displacement A(D between the two using the phase detector 218.

Figure 6:
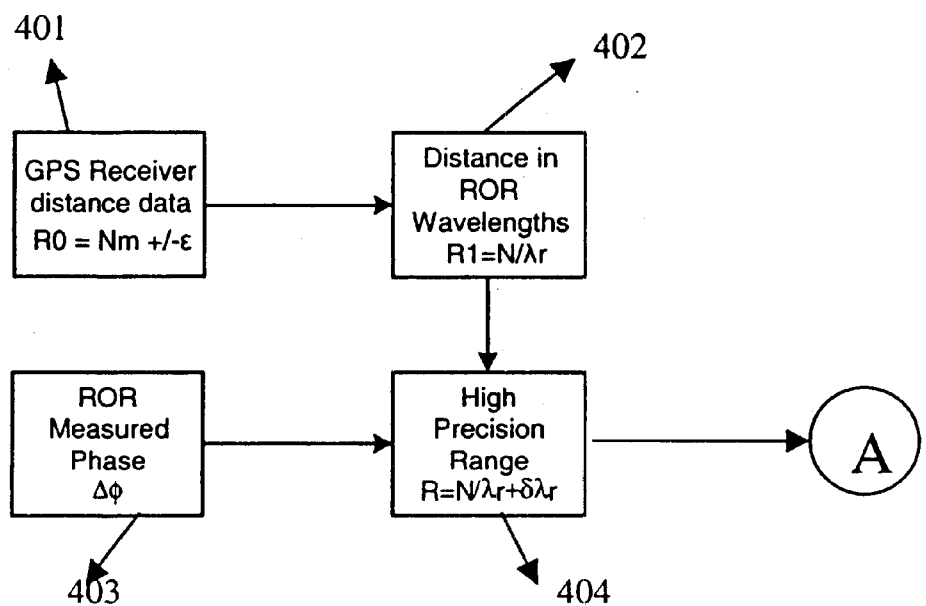
FIG. 6 is a block diagram of a method used to calculate the high precision range between two airborne platforms according to an embodiment of the invention.

FIG. 6 is a diagram of a method for achieving the high precision range measurement between the airborne platforms according to an embodiment of the invention. In step 401, the initial measure of range (e.g., R0=N +/−ϵ, where ϵ is the error in the measurement) is established using the GPS system as described in FIG. 2. In step 402, This measure of range is converted into the number of wavelengths R1 of the signal used by the range-only radar 210 by dividing the range N by the wavelength $\lambda r$ of the range-only radar 210 signal. In step 403, the value of the phase displacement $\Delta\Phi$ as given by the range-only radar 210 is converted into a distance value $\delta\lambda r$ by dividing the phase displacement $\Delta\Phi$ by 360° and multiplying it by the wavelength $\lambda r$ of the range-only radar 210. In step 404, the measurement of distance received by the GPS system as per step 402 is added to the measurement of the phase displacement distance as received by step 403, to get the high precision range R of the distance between the two airborne platforms. The implementation of steps 401 to 404 as described here is well known to those of ordinary skill in the art.

Figure 7:
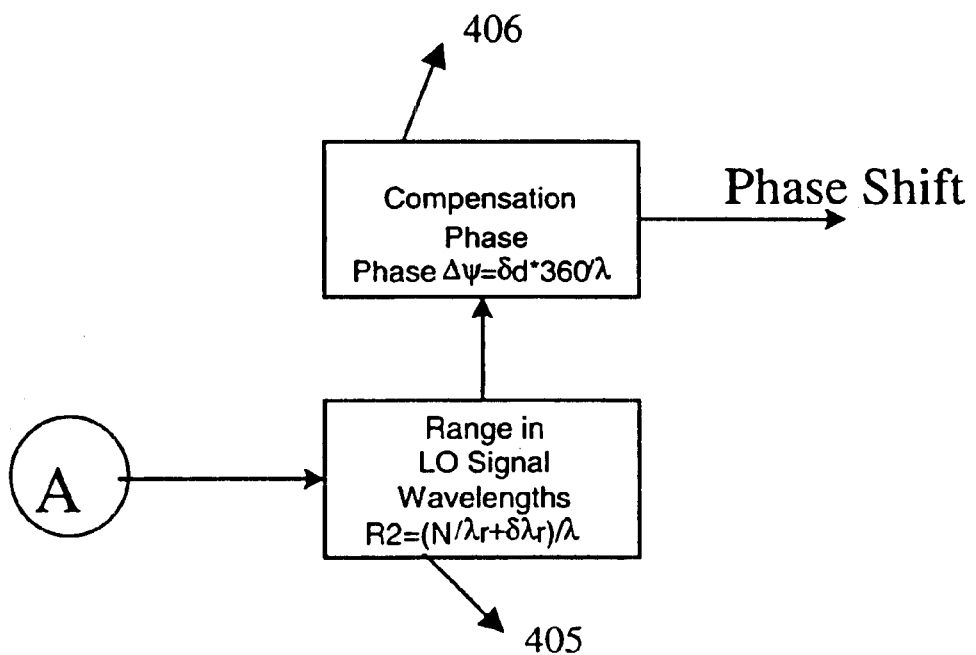
FIG. 7 is a block diagram of a method used to develop compensation phase using high precision range measurement system according to an embodiment of the invention.

FIG. 7 is a diagram of a method used for developing the compensation phase sequence used to phase shift a local oscillator on one of the platforms. In step 405, the precise value of the range R between the two platforms is divided by the wavelength $\lambda$ of the ECM signal used to block the threat radar system, to get the number of wavelengths R2 of the threat radar system. The remainder $\delta d$ of this operation is the partial number of wavelengths of the ECM signal. In step 406, this value is converted into a phase value by multiplying $\delta d$ by 360° and dividing it by $\lambda$, the wavelength of the ECM signal. The to resulting phase value $\Delta\Psi$ gives the value of the phase difference by which the local oscillator on one platform is to be compensated to bring its signal in phase with the signal of the local oscillator on the other platform. To bring the signals of local oscillators on both platforms in phase with each other, the resulting phase value of 360−$\Delta\Psi$ is inserted into one of the local oscillator. The inserted phase shift causes a time delay in the output of the local oscillator signal on one of the platform so that spatially the distance between the ECM signal waves appears to be a whole number of wavelength. This allows the output signal from the EW system on both platforms to combine spatially to block the threat radar from identifying the target aircraft.

The implementation of these steps 405 and 406 as described here is well known to those of ordinary skill in the art.

Figure 8:
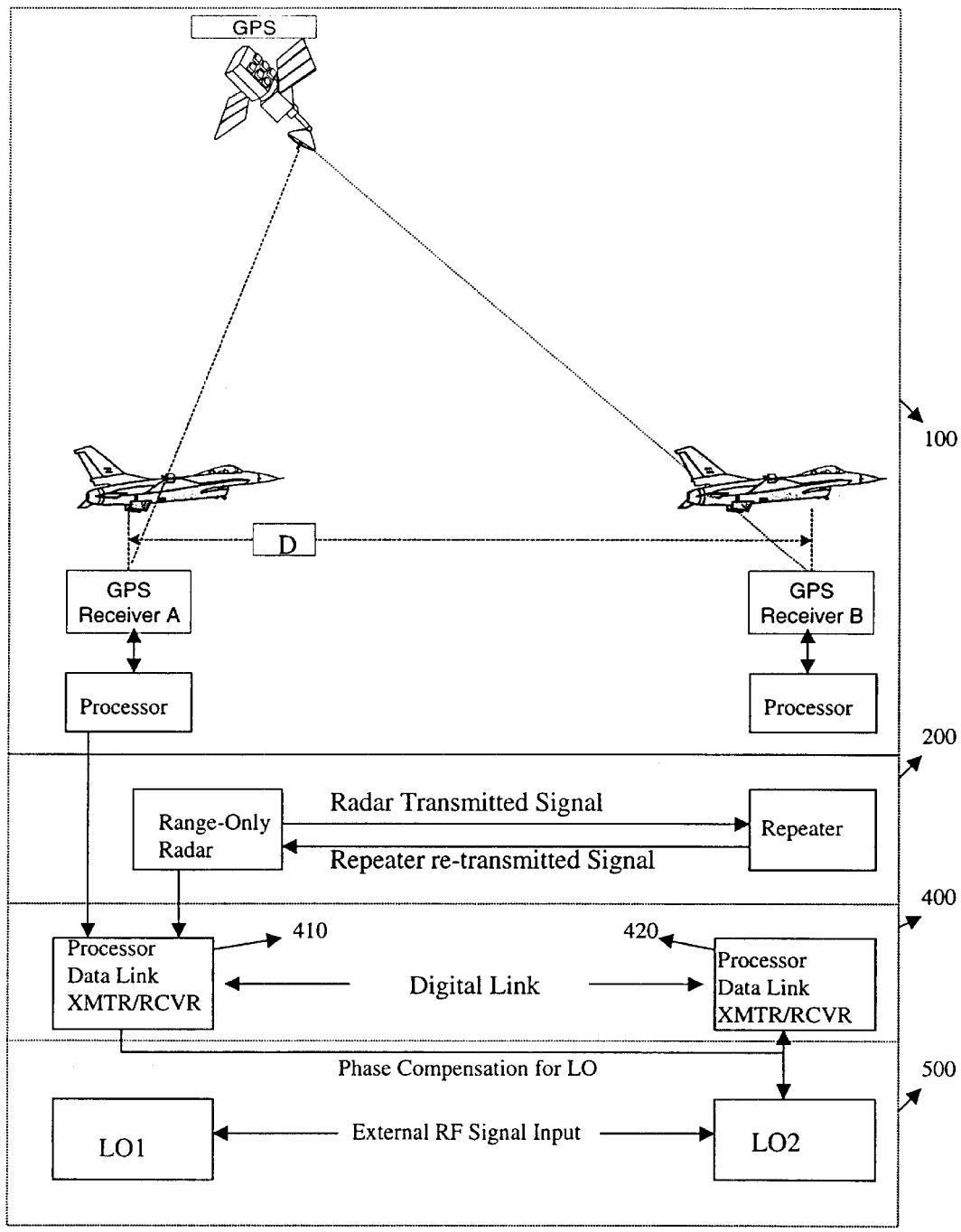
FIG. 8 is a block diagram of an embodiment of the high precision range measurement system used in EW system.

FIG. 8 is a diagram of an embodiment of the high precision range measurement system implemented in an EW system using two airborne platforms. 100 is the GPS system described in FIG. 1. 200 is the range-only radar and repeater system described in FIG. 2. 400 contains processors located on two airborne platforms, while 500 contains the local oscillators located on two airborne platforms.

The GPS system 100 is used to make a preliminary estimate of the distance between two platforms as described in FIG. 1. This preliminary estimate of the distance between two platforms is fed into the processor 410 that converts that distance into range-only radar wavelengths as shown in step 402 of FIG. 6. The functioning of the range-only radar 210 with the repeater 220 in 200 is described in FIG. 5. The phase difference measured in 200 is fed into processor 410. The processor 410 receives input from the GPS system 100 and the range-only radar system 210. The processor 410 uses these inputs to calculate the high precision range between the two platforms as described in FIG. 6. The processors 410 and 420 used in 400 also contain data link in order for the transmitter and receiver to communicate with each other. The establishment and functioning of data link between processors is well known to those of ordinary skill in the art.

In an embodiment of the present invention used in EW system, the precise range measurement calculated in step 400 is used to develop the compensation phase sequence to phase shift the local oscillator LO2 as described in step 500. The compensation phase sequence is calculated as described in FIG. 7. The EW system which contains local oscillators LO1 and LO2, receive an RF input signal of the same frequency as the one transmitted by the threat radar system. As a result of the phase shifting of local oscillator LO2, the signals generated by the local oscillator LO1 and the local oscillator LO2 combine spatially such that the resulting signal is 180° degrees out of phase with the signal generated by the threat radar system and reflected by a target vehicle. In addition, the EW system inverts the amplitudes of the received signal. Such inversion of RF signal amplitude is well known to those of ordinary skill in the art. Such signal, when received at the threat radar, nullifies the signal reflected from the target vehicle. As a result, the threat radar is not able to identify the location, speed, range and angle of the target vehicle. This and other applications of the precise range measurement technique described in the invention will be obvious to those of ordinary skill in the art.

As it should be clear to those of ordinary skill in the art, further embodiments of the present invention may be made without departing from its teachings and all such embodiments are considered to be within the spirit of the present invention. Therefore, it is intended that all matter contained in above description or shown in the accompanying drawings shall be interpreted as exemplary and not limiting, and it is contemplated that the appended claims will cover any other such embodiments or modifications as fall within the true scope of the invention.

What is claimed is:

1. A method of measuring distance between two platforms with high precision, comprising the steps of:
   determining an estimate of distance D between the two platforms within a first range of error;
   transmitting an RF signal from a range-only radar located on a first platform;
   receiving the RF signal transmitted by the range-only radar on the first platform by a repeater located on a second platform;
   retransmitting the RF signal by the repeater on the second platform;
   receiving the retransmitted RF signal by the range-only radar located on the first platform;
   measuring phase difference between the RF signal transmitted by the range-only radar located on the first platform and the RF signal retransmitted by the repeater located on the second platform;
   converting the measured phase difference to a measure of distance $\delta$; and
   adding the estimate of the distance D to the measure of distance $\delta$, to obtain a measure of total distance between the two platforms.

2. The method of claim 1 where the estimate of distance D between the two platforms is determined using a global positioning system.

3. The method of claim 2 where the first and the second platforms are on airborne vehicles.

4. The method of claim 2 wherein the wavelength of the RF signal transmitted from the range-only radar located on the first platform is greater than the first range of error.

5. The method of claim 4 wherein the RF signal transmitted by the range-only radar is in the form of a stream of coherent pulses.

6. The method of claim 2 further comprising the steps of:
   dividing the measure of total distance between the two platforms by wavelength of signal generated by a second local oscillator on the second platform;
   converting the remainder from the division to a phase shift value; and
   inserting the phase shift to the local oscillator on the second platform.

7. The method of claim 6 further comprising:
   transmitting of a first ECM signal by a first local oscillator on the first platform; and
   transmitting of a second ECM signal by the second local oscillator on the second platform.

8. The method of claim 7 wherein the frequency of the first local oscillator on the first platform and the frequency of the second local oscillator on the second platform is equal to the frequency of a signal generated by a threat radar system and reflected by a target vehicle.

9. The method of claim 8 wherein the ECM signal transmitted by the first local oscillator on the first platform and the ECM signal transmitted by the second local oscillator on the second platform combine spatially such that the combined signal is 180° degrees out of phase with the signal generated by the threat radar system and reflected by the target vehicle.

10. A system for measuring distance between two platforms with high precision comprising:
   a system for measuring an estimate of distance D between the two platforms within a first range of error;
   a range-only radar located on a first platform for transmitting an RF signal;
   a repeater located on a second platform for receiving the RF signal transmitted by the range-only radar located on the first platform and for retransmitting an RF signal;
   the range-only radar receiving the RF signal retransmitted by the repeater and measuring phase difference between the RF signal transmitted by the range-only radar and the RF signal retransmitted by the repeater;
   a processor for converting the measured phase difference value to a measure of distance $\delta$ and adding the measure of distance δ to the estimate of distance D, to obtain a measure of total distance between the two platforms.

11. The system of claim 10 wherein the system for measuring the estimate of distance D between the two platforms is a global positioning system.

12. The system of claim 11 wherein the first and second platforms are on airborne vehicles.

13. The system of claim 11 wherein the wavelength of the RF signal transmitted from the range-only radar located on the first platform is greater than the first range of error.

14. The system of claim 13 wherein the RF signal transmitted by the range-only radar is in the form of a stream of coherent pulses.

15. The system of claim 11 further comprising a first local oscillator on the first platform and a second local oscillator on the second platform, wherein:

the processor divides the measure of total distance between the two platforms by the wavelength of the signal of the second local oscillator on the second platform, converts the remainder of the division to a phase shift value, and inserts the phase shift to the second local oscillator on the second platform.

16. The system of claim 15 wherein:

the first local oscillator on the first platform transmits an ECM signal and the second local oscillator on the second platform transmits an ECM signal.

17. The system of claim 16 wherein the frequency of the ECM signal transmitted by the first local oscillator on the first platform and the frequency of the ECM signal transmitted by the second local oscillator on the second platform are equal to the frequency of a signal generated by a threat radar system and reflected by a target vehicle.

18. The system of claim 17 wherein the ECM signal transmitted by the first local oscillator on the first platform and the ECM signal transmitted by the second local oscillator on the second platform combine spatially such that the combined signal is 180° degrees out of phase with the signal generated by the threat radar system and reflected by the target vehicle.

* * * * *